(12) United States Patent
Hupp et al.

(10) Patent No.: US 7,783,302 B2
(45) Date of Patent: Aug. 24, 2010

(54) APPARATUS AND METHOD FOR DETERMINING A CURRENT POSITION OF A MOBILE DEVICE

(75) Inventors: Jürgen Hupp, Nürnberg (DE); Steffen Meyer, Erlangen (DE); Marcus Bliesze, Erlangen (DE); Melanie Sippl, Nürnberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 640 days.

(21) Appl. No.: 11/625,533

(22) Filed: Jan. 22, 2007

(65) Prior Publication Data

US 2007/0184850 A1 Aug. 9, 2007

Related U.S. Application Data

(63) Continuation of application No. PCT/EP2005/007083, filed on Jun. 30, 2005.

(30) Foreign Application Priority Data

Jul. 22, 2004 (DE) ...................... 10 2004 035 531

(51) Int. Cl.
*H04W 24/00* (2009.01)
*H04K 3/00* (2006.01)
(52) U.S. Cl. .................................... 455/456.1; 342/457
(58) Field of Classification Search .............. 455/456.1, 455/456.5, 456.6, 457; 343/457–458, 464
See application file for complete search history.

(56) References Cited

U.S. PATENT DOCUMENTS 6,799,047 B1 * 9/2004 Bahl et al. ................ 455/456.1
2005/0102101 A1 * 5/2005 Beesley et al. .............. 701/209

FOREIGN PATENT DOCUMENTS

| EP | 1022578 | 7/2000 |
|---|---|---|
| EP | 1109031 A1 | 6/2001 |
| WO | WO9815149 | 4/1998 |
| WO | WO2004008795 | 1/2004 |

* cited by examiner

*Primary Examiner*—Lee Nguyen
(74) *Attorney, Agent, or Firm*—Michael A. Glenn; Glenn Patent Group

(57) ABSTRACT

An apparatus for determining a current position of a mobile device in an environment in which at least one transmitter is disposed includes a means for providing a cartographic map of the environment, the cartographic map including field strength reference values at reference points, a means for determining a field strength value, a means for deriving a reference point within reach that can be reached starting from a previous position of the mobile device by movement of the mobile device in the environment within a predetermined time interval, from the cartographic map of the environment, and a comparator for comparing the field strength value with a field strength reference value at the reference point within reach in order to determine the current position. By including the cartographic map of the environment, the position determination is simplified.

13 Claims, 4 Drawing Sheets

APPARATUS AND METHOD FOR DETERMINING A CURRENT POSITION OF A MOBILE DEVICE

CROSS-REFERENCE TO RELATED APPLICATION

This application is a continuation of co-pending International Application No. PCT/EP2005/007083, filed Jun. 30, 2005, which designated the United States and was not published in English and is incorporated herein by reference in its entirety.

BACKGROUND OF THE INVENTION

1. Field of the Invention

The present invention relates to position determination of mobile devices.

2. Description of the Related Art

With ever-increasing prevalence of handy, mobile devices (e.g. PDAs) in connection with exhaustive availability of digital transmission technologies (e.g. WLAN, etc., UMTS, GPRS), the market for applications providing the user with location-relevant information in every situation is growing. For this reason, the importance of efficient localization of mobile devices for modern, user-friendly applications is growing.

In the area within buildings (indoor area), the development of suitable localization methods is a challenge, because walls and fixtures may render the employment of common positioning technologies significantly difficult or impossible. But especially within buildings or in the combined indoor and outdoor area, manifold localization-dependent applications arise, such as guidance systems for finding rooms, things and employees, patient emergency systems in the medical area, or applications in the field of workfloor management.

In order to be able to perform this assistance in sensible manner, it is inevitable for a participant to be able to query his or her position in the building at any time (or at any place of the building, which means complete coverage).

The known methods for position determination, for example, are GPS, triangulation via runtime measurements, or also radio cell recognition through base station identification. In these concepts, however, their great complexity, which is connected to high costs, as well as maybe high inaccuracy, is disadvantageous.

WO 02/054813 A1 discloses a method for estimating a position of a receiver in a wireless communication environment having several channels. Each channel has at least one signal parameter that varies depending on the position, with this variation being different for each channel. A set of calibration data is determined for each calibration point, each set including the position and at least one measured signal parameter for each of the channels. The calibration data serve as a basis for a statistical model of the signal parameters depending on a position of the receiver. Furthermore, a set of observed signal parameters, which includes at least one signal parameter for each of the plurality of channels, is determined. On the basis of the statistical model and the set of the observed signal parameters, the position of the receiver is approximated. Since this method starts out from the assumption that a different signal parameter, which is different from all other signal parameters for this channel and at a certain position, can be associated with each of the channels, this method can be employed exclusively for such a scenario. A further disadvantage in the concept disclosed in the above reference, is that the statistical model is acquired on the basis of a probability distribution, which is connected with high computation complexity as well as residual insecurity with respect to the position of the receiver.

EP 1022578 A2 concerns a device using radio signal strength to estimate the momentary position of a mobile body relative to a map. The device periodically receives a set of measured values of the radio field strength of respective radio signals from a plurality of base stations from the mobile body, stores these sets and applies averaging methods to the entire sequence of sets of measured radio signal strength values so as to obtain a corresponding sequence of sets of smoothed radio signal strength values. Based on previously measured values of the radio signal strength, which have been obtained previously for each of a plurality of predetermined points, such as road intersections, the device is effective, with respect to the sequence of sets of smoothed radio signal strength values, to estimate those of the predetermined points that have been crossed by the mobile body one after the other until the momentary point in time, in order to thereby estimate the momentary position of the mobile body.

From WO 98/15149, a method for localizing a mobile station is known, in which information received and measured by a mobile station is transmitted to a network management system. The information is compared with the field strength information in a field strength matrix, wherein the location of the mobile station is estimated as coordinates of the field strength matrix relative to the base station of the serving cell and the base station of a neighboring cell in such manner that the information received and measured by the mobile station corresponds to the field strength information in the field strength matrix in as accurate a manner as possible.

SUMMARY OF THE INVENTION

It is an object of the present invention to provide an efficient concept for position determination.

In accordance with a first aspect, the present invention provides an apparatus for determining the current position of a mobile device in an environment in which at least one transmitter is disposed, having: a provider for providing a cartographic map of the environment, the cartographic map including field strength reference values at reference points; a determinator for determining a field strength value; an identifier for deriving reference points within reach that can be reached starting from a previous position of the mobile device by movement of the mobile device in the environment within a predetermined time interval, from the cartographic map of the environment; and a comparator for comparing the field strength value with the field strength reference values at the reference points within reach, wherein the reference point the field strength reference value of which most likely corresponds to the field strength value is established as current position.

In accordance with a second aspect, the present invention provides a method for determining a current position of a mobile device within an environment in which at least one transmitter is disposed, with the steps of: providing a cartographic map of the environment, the cartographic map of the environment including field strength reference values at reference points; determining a field strength value at the current position; deriving reference points within reach that can be reached starting from a previous position of the mobile terminal by movement of the mobile terminal in the environment within a predetermined time interval, from the cartographic map of the environment; and comparing the field strength value to the field strength reference values at the reference points within reach, characterized by the step of establishing the reference point the field strength reference value of which most likely corresponds to the field strength value as current position.

In accordance with a third aspect, the present invention provides a computer program with a program code for performing, when the program is executed on a computer, a method for determining a current position of a mobile device within an environment in which at least one transmitter is disposed, with the steps of: providing a cartographic map of the environment, the cartographic map of the environment including field strength reference values at reference points; determining a field strength value at the current position; deriving reference points within reach that can be reached starting from a previous position of the mobile terminal by movement of the mobile terminal in the environment within a predetermined time interval, from the cartographic map of the environment; and comparing the field strength value to the field strength reference values at the reference points within reach, characterized by the step of establishing the reference point the field strength reference value of which most likely corresponds to the field strength value as current position.

The present invention is based on the finding that a position of a mobile device in an environment in which one or more base stations are arranged can be determined efficiently by using a cartographic model of the environment, which for example comprises obstacles, in order to determine, on the basis of a currently measured field strength value, for example, and a position of the mobile device at an earlier point in time, for example, its most probable current position.

By using an environment model in the position determination, starting from a previously determined position of the mobile device, for example, positions that cannot be reached starting from the previous position of the mobile device either due to an obstacle or that cannot be reached by movement of the mobile device within a time interval, for example one millisecond, can be excluded a priori. By analogy therewith, starting from the previous position, a preselection of the positions eligible at all for the current position of the mobile device can be made beforehand. Thereby, on the one hand, the position determination is simplified, because a number of the potential positions is reduced. On the other hand, secure and accurate position determination can be achieved thereby.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
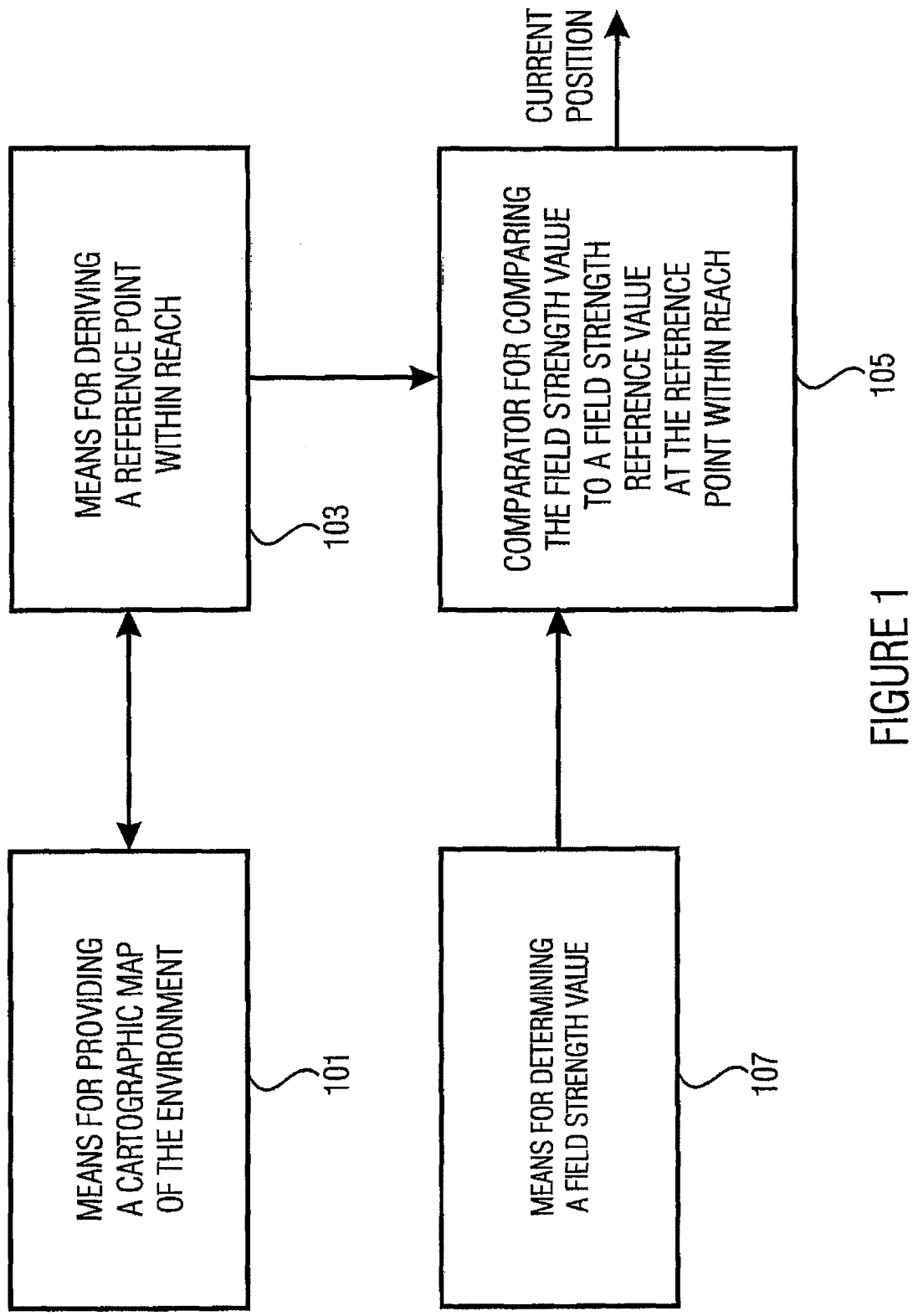
FIG. 1 shows an apparatus for determining a current position of a mobile device according to an embodiment of the present invention.

FIG. 1 shows a principle block diagram of an inventive apparatus for determining a current position of a mobile device in an environment in which at least one transmitter, for example a base station, is arranged. The apparatus includes means 101 for providing a cartographic map of the environment, which preferably includes field strength reference values at reference points of the environment. Means 101 for providing the cartographic map of the environment is coupled to means 103 for deriving a reference point within reach, which can be reached starting from a previous position, which for example has been determined at a previous point in time, by movement of the mobile device in the environment within a predetermined time interval. Means 103 for deriving the reference point within reach is coupled to a comparator 105 for comparing a field strength value with a field strength reference value at the reference point within reach. The field strength value is a field strength value at the current position of the mobile device. In order to determine this field strength value, the apparatus shown in FIG. 1 further includes means 107 for determining a field strength value, which is coupled to the comparator 105.

Preferably, means 107 for determining the field strength value is formed to measure the field strength value at a current position at which the mobile device momentarily is. To this end, means 107 for determining the field strength value may for example include a field strength sensor. According to a further embodiment, means 107 for determining the field strength value includes a receiver formed to receive the electromagnetic waves radiated from the transmitter set up in the environment or from a plurality of transmitters set up in the environment, and to determine the field strength values on the basis of the received waves.

According to a further embodiment of the present invention, means 107 is formed to measure the field strength values in regular measurement intervals. For example, means 107 for determining the field strength value is formed to measure the field strength values at regular points in time defining the measurement intervals, with a temporal spacing between two measurement time instants being one millisecond, for example.

Furthermore, means 107 for determining the field strength value can be formed to determine the field strength reference values required for the position determination for example during a learning phase. To this end, means 107 for determining may be formed to determine a field strength reference value by averaging among a currently measured field strength value and a mean value of measured field strength values determined at an earlier point in time.

In order to update the cartographic map of the environment with respect to the field strength reference values, means 101 for providing the cartographic map of the environment may be formed to enter one or more field strength reference values that have been determined by means 107 for determining the field strength value into the cartographic map of the environment at the accompanying reference points, wherein a reference point may for example be localized by indication of its three-dimensional coordinates (x, y, z), for example in meters, in the environment.

Means 103 for deriving the reference point within reach may preferably be formed to derive the reference point within reach from the cartographic map of the environment. The predetermined time interval may for example be a time interval between two successive measurement procedures performed by means 107 for determining the field strength value. The time interval may for example range from one to 10 ms.

According to a further embodiment of the present invention, means 107 for deriving the reference point within reach is formed to determine the reference point within reach on the basis of a calculation of a shortest path between a previous position of the mobile device and a plurality of reference points within reach from the previous position by movement of the mobile device.

For example, means 103 is formed to establish a routing map including all possible connections between reference points in the environment that are within reach by movement of the mobile device. For example, means 107 for deriving is formed to calculate a shortest connection between a first reference point and a second reference point, which then represents a possible connection, wherein graph-theoretical algorithms may be employed to this end, for example.

According to a further embodiment of the present invention, means 103 for deriving is formed to determine the above-mentioned routing map using a routing algorithm, for example the Dijkstra algorithm.

The comparator 105 illustrated in FIG. 1 is preferably formed to determine the current position of the mobile device on the basis of a comparison of the captured field strength value at the current position with preferably a plurality of field strength reference values at various reference points that can be reached from the previous position, wherein the current position corresponds to the reference point in the environment that is associated with a field strength reference value having a smallest difference with respect to the currently captured field strength value. In other words, the comparator 105 is formed to compare the field strength value with the field strength reference value at the reference point within reach and with a further field strength reference value at a further reference point that can be reached from the previous position, and to determine, as the current position, a reference point associated with a field strength reference value most closely corresponding to the field strength value.

According to a further aspect of the present invention, the comparator 105 may be formed to determine the reference point within reach as the current position if the field strength reference value matches the field strength value currently captured within a predetermined value interval. The predetermined value interval may be a relative field strength reference value-related interval including values between 0.51 and 1, for example.

According to a further aspect of the present invention, a position algorithm using location-dependent reference data (physical model), for example, acquired in a learning phase is employed for position determination. The positioning is based on the comparison of current measurement data according to the reference data. A description of the environment, for example in form of the cartographic map of the environment already mentioned, which is a logical model as opposed to the physical model, enables recognizing possible directions of movement and excluding impossible ones, for example a movement through a wall.

The core of the position algorithm may be a modeling of the environment by models, for example. Here, the starting point is a geographic environment description, for example in form of a construction plan. Furthermore, the geographic environment description may include information on the location of rooms, walls, passages (doors, stairs), and superstructural conditions. Usually, this data is present as a paper plan or CAD file from the planning of the building. The environment models can be derived from this plan.

Figure 2:
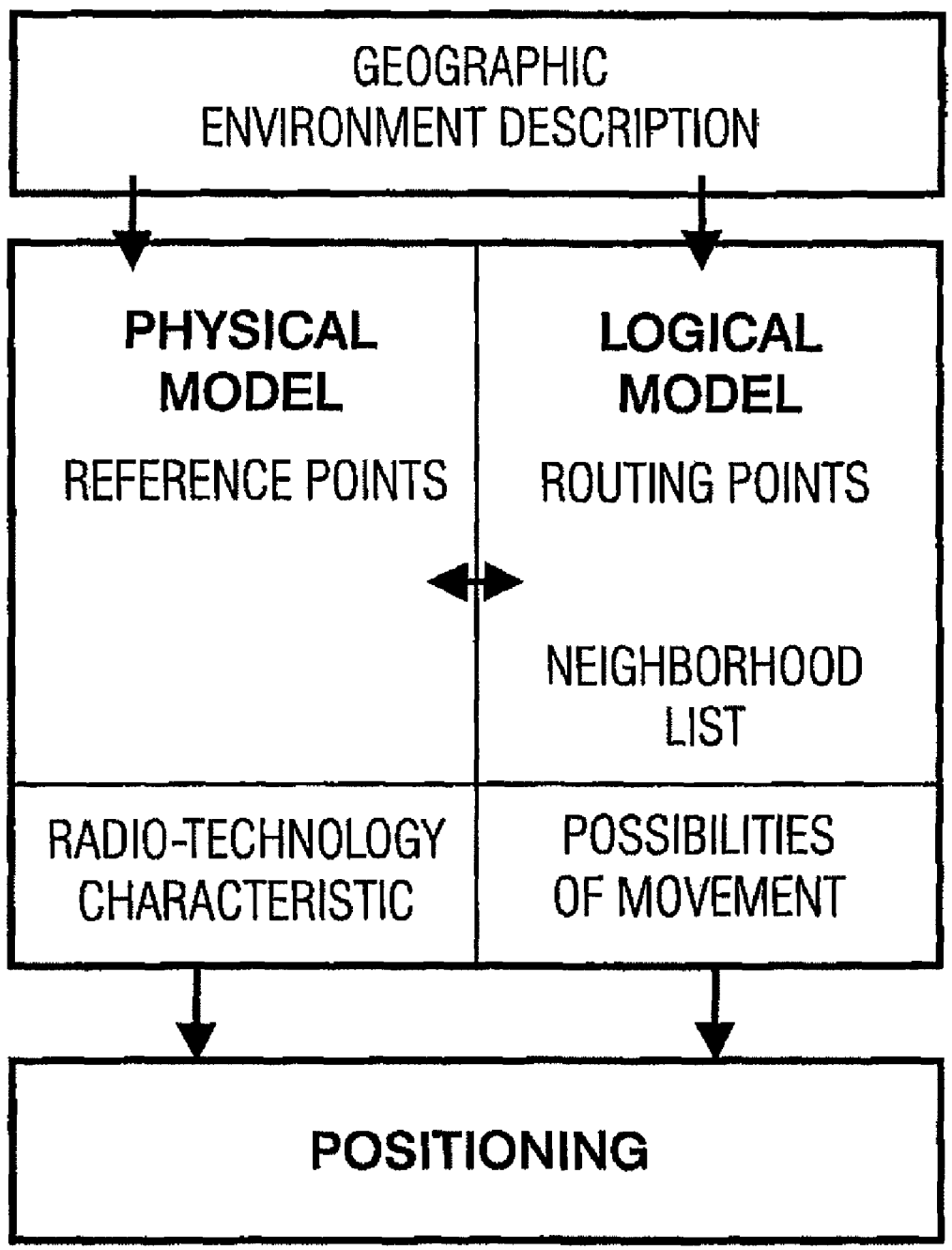
FIG. 2 shows the inventive concept.

In FIG. 2, the inventive concept is illustrated. The geographic environment description, for example in form of the cartographic map of the environment already mentioned, consists of a physical model, which includes reference points, for example, and of a logical model, which includes routing points or neighborhood lists, for example. The physical model provides a radio-technology characteristic, whereas movement possibilities can be derived from the logical model. On the basis of the radio-technology characteristic and the movement possibilities, the positioning can be performed.

For example, the physical model contains the propagation characteristic of the signals of all transmitters, for example all radio base stations set up in the environment. It consists of an amount of reference points at which the field strength of all stations that can be received there is known. The physical model may for example be acquired by explicitly gathering the data in a learning phase. Albeit intensive, this method provides very exact results.

The logical model makes it possible to quickly and efficiently decide whether a movement between two points in direct way is admissible and what the shortest real path between two points of the environment, for example between two reference points, looks like. It consists of previously calculated routing information. For the buildup of the logical model, rooms and connections between rooms (doors, passages etc.) are extracted from the geographic environment description. Thereby, a graph of rooms develops. Wherever there are connections in the graph, a direct transition is possible. For example, the graph provides the basis for a rough path calculation between points in different rooms. The rough path calculation provides a sequence of rooms from the starting room to the target room. To this end, as already mentioned, routing algorithms, for example the A* algorithm, can be employed. The A* algorithm is a variant of the widely known algorithm of Dijkstra optimized for path finding.

For the fine calculation of the path (path finding within rooms or from a point in a room to the door), according to a further aspect of the present invention, an amount of points (routing points) is defined in each room. Each reference point in the physical model is a routing point in the logical model at the same time. Points at the room transitions (e.g. midpoint of a door) may also be defined as routing points. Between the routing points of a room, the respective shortest path courses are pre-calculated, wherein also a potentially adapted form of the A* routing algorithm may be employed, so that a direct connection, for example as the crow flies, is not possible. By the combination with the above-described rough calculation, the shortest real path can now efficiently be calculated between all reference points of the physical model.

According to a further aspect of the present invention, the logical model may additionally include a neighborhood list associating a set of neighbor routing points with each routing point. The maximum distance of a real path is configurable and depends on the expected maximum velocity of the mobile terminals. The neighborhood list is acquired in the buildup of the model from the above routing information.

As already mentioned, the reference data may be acquired in a learning phase. For example, the reference data are captured at various positions within the building in the learning phase. For a learned routing point, for example its position (x, y and z) in real coordinates, for example meters, such as a list of radio base stations heard at this point with their mean field strength, their standard deviation and the reception frequency (for example in percent) are stored. The learning method is automated in the respect that the user can move to any points within the building and, by a click on the room plan, gives the system the current position and thus triggers the learning process. The system then periodically performs a scan operation with the radio network map. In this, all base stations within the reception area are detected and captured with their momentary reception field strength.

The scan operation is performed so often until the provided results are stable, which means until the mean value of the measured values of each individual base station only changes by less than a configurable threshold value. By mean value, an averaging method robust against outliers and similar to the median in result, but quicker to calculate (so-called robust mean value) is understood. In addition to the field strength value, it may be recorded, how often each base station has been measured. If recording errors arise during the measurement value capture or if no stable mean value arises even after a configurable maximum number of measurements, e.g. because the user keeps walking during the measurements instead of staying at the measurement point, the measurement is cancelled and the user is informed thereof.

The acquired information (coordinates as well as list of base stations with means field strength, standard deviation and reception frequency) are filed in a database as part of the physical environment model, to mention only one among many possibilities of data storage. Following completion, the user is informed and may then move to a new point.

Current measurement values (a list of base stations currently in the reception area together with the accompanying field strength values) are determined from the radio map, for example, at regular intervals for the position determination.

These values may be post-processed by a configurable filter, and thereby wrong measurements are minimized, and the reliability of the method is increased. The filter may for example be a weighted averaging between the newly measured value of a base station and the last mean value stored in the filter. For example, the method already mentioned (robust mean value) is employed for averaging. Preferably, no further (e.g. statistical) methods for rendering the raw data are employed. After this phase, a list of base stations with smoothed field strength values is available.

Due to the last calculated geographic position, then a selection of routing points (candidate points) is made, which are eligible for new position. For example, this is done in two steps. At first, the next routing point to the last calculated position (previous position) is determined. Then, the abovementioned neighborhood list of the logical model is used, in which the possible routing points may be looked up. In this manner, the logical model excludes the routing points that are indeed geographically close, but can really only be reached by a detour.

By comparing of the current measurement values with the stored ones, a most probable new routing point, which is eligible for a potential current position, is determined from the routing points. For example, the differences of the measurement values (field strength information), the reception frequency determined in the learning phase, the relative strength of the signals of different stations (ordering of the stations according to field strength), as well as references between currently received stations and stations at the routing points, go into the comparison. The most probable routing point in these aspects is fed into a prediction unit. From the criteria mentioned, a quality value providing an indication on how well the set of current measurement values fits on this routing point is additionally calculated from the criteria mentioned.

The position prediction unit for example calculates a new position from the last position and the position of the most probable routing point with the aid of the routing information of the logical model. With this, it can be seen that the path between old and new position may perhaps not be covered in direct way, since passage is possible only through a door at a distance of one meter, for example. The position prediction unit therefore calculates a position on the path possible on the basis of the logical environment model from the old position to the most probable routing point. This position goes into the next iteration of the calculation as current position.

Figure 3:
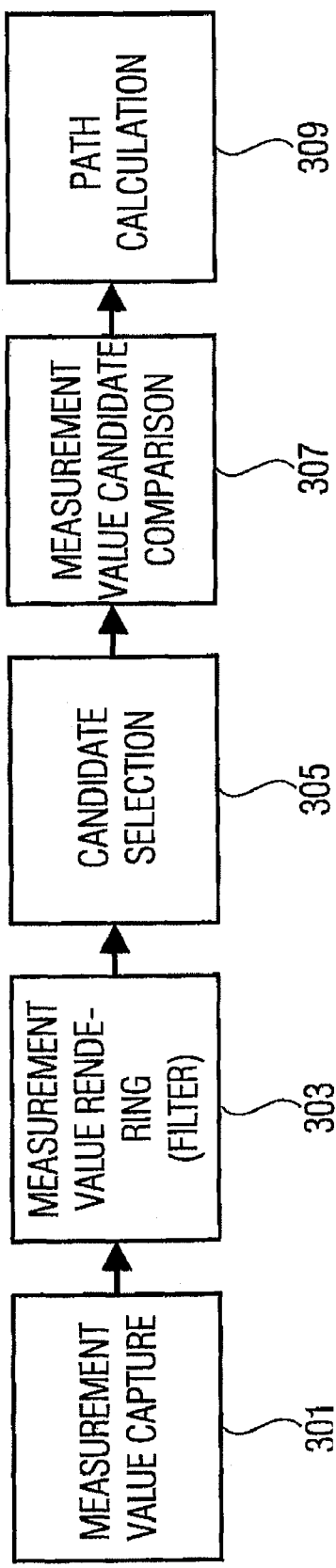
FIG. 3 shows determining a current position of a mobile device according to a further embodiment.

FIG. 3 illustrates a structure of the inventive method for determining a current position according to a further embodiment of the present invention.

At first, in step 301, measurement value capture takes place, for example a measurement of the field strength. In a further step 303, the measurement values are rendered, wherein filtering is performed, as already mentioned. Then, in step 305, candidate selection takes place, as well as subsequent measurement value candidate comparison in step 307. On the basis of the measurement value candidate comparison, path calculation is performed in step 309.

According to a further aspect of the present invention, the positioning algorithm may be adapted to the special conditions by a multiplicity of configuration parameters. For example, the parameters determine at which frequency the data capture and recalculation of the position is to take place, or which maximum velocity of the mobile terminal may be assumed. For example, the algorithm consists of a set of meshing sub-algorithms present in various variants (e.g. optimized for a trade fair environment or office environment). A currently optimum set of sub-algorithms may be linked to an adapted overall system via the configuration parameters.

The inventive concept may for example be employed within a cellular radio system (e.g. WLAN or DECT) with at least one base station, with the radio system enabling unique identification of a base station.

The inventive system may for example include a receiver system for the capture of the base station identification and for the capture of the signal parameters, e.g. reception field strength, RSSI (radio signal strength indicator) data capture of all signals of the individual base stations that can be received at one point in time. The receiver system may for example be mobile or fixedly built-in, e.g. PDA, mobile phone, belt device, notebook, watch, extension box, etc.

The inventive system may further include a processing unit for performing the positioning algorithms, an environment model for the description of the environment, a database with reference values of the signal parameters measured in the environment, etc.

The system may further include configuration parameters for the adaptation of the positioning algorithms to various environmental conditions or prediction models. Moreover, post-processing for rendering the position data, e.g. interpolation of intermediate values, averaging, etc., may optionally be provided.

Figure 4:
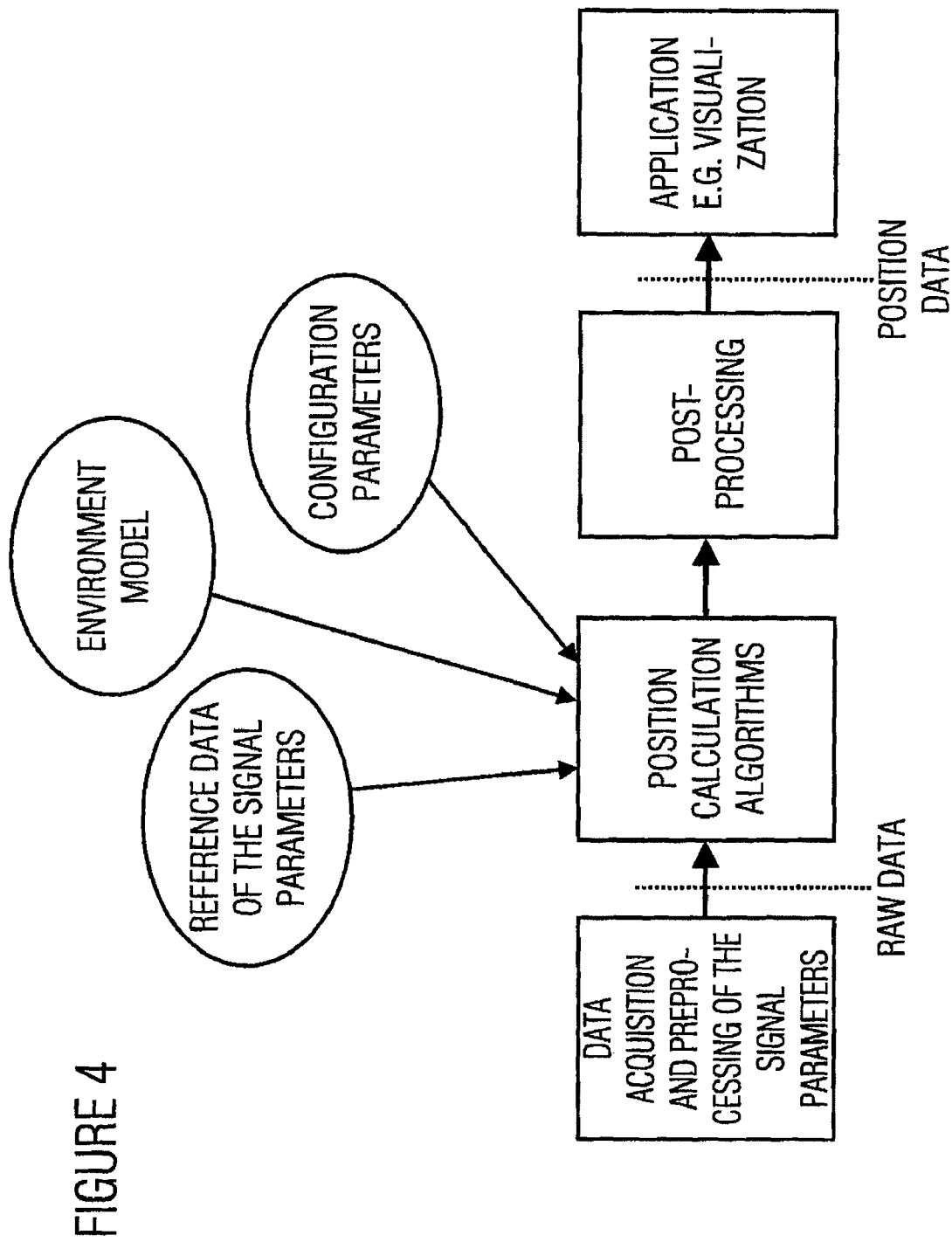
FIG. 4 shows determining a current position of a mobile device according to a further embodiment.

FIG. 4 illustrates the inventive method for determining the current position according to a further embodiment of the present invention.

The data acquisition takes place on the device for which the position is to be determined. All further processing units may be distributed, which means that the method is supplemented with a unit for the transmission of the capture data, the intermediate results or the calculated position data, with the aim of further processing in an extended network with distributed processing units or in a central unit.

According to a further aspect of the present invention, for example, in the learning phase reference measurements of the signal parameters are made at points of the target environment, e.g. possible locations. These are rendered and stored in a database. According to a further embodiment, the properties and conditions, such as walls, type, doors, impossible areas, stairs, etc., are described in an environment model preferably in a coordinate system. Thus, a logical and physical description of the environment results.

The configuration parameters contain information on the control of the algorithms, such as maximum velocities of the mobile terminals, weighting factors, etc. Profiles for certain target applications are possible, which are characterized by a set of configuration parameters.

For the position calculation, current signal parameters are captured, processed and handed over to the position algorithm as raw data. This determines the most probable location with the aid of the reference measurements, the environment description and the configuration parameters.

By including the environment modeling, an increase in accuracy is achieved, because the inventive environment modeling on its own excludes impossible paths, such as going through a wall.

According to a further aspect, the present invention provides a positioning system with an apparatus for determining the current position, as it is described above. For example, the system includes one or more antennas to receive the signals of the transmitters (baseband stations). The system may for example be constituted by a mobile device, e.g. a mobile phone, and the apparatus for determining the current position. The positioning system may further include all functionalities described above in arbitrary combination.

According to a further aspect of the present invention, the system may, however, be stationary and may centrally evaluate the signals detected from a plurality of antennas set up in the rooms, in order to establish the cartographic map of the environment described, for example.

According to a further aspect of the present invention, several antennas may be used in an inventive positioning system, in order to achieve more accurate and reliable determination of the RSSI values due to the antenna diversity achieved therewith.

According to a further aspect of the present invention, a compass may be used for improving the spatial orientation of the user, i.e. the mobile terminal. In this case, the inventive apparatus for determining the current position includes a compass, for example.

According to a further aspect of the present invention, the apparatus for determining the current position may further include sensor systems, e.g. velocity or acceleration sensors, which are adapted to special applications, such as running, driving, etc., in order to enable optimized position and orientation determination. According to a further aspect of the present invention, a combination of the receiver with inertial sensor systems, such as described above, may be provided in a terminal, for example.

According to a further aspect of the present invention, a combination of various radio systems, such as DECT, WLAN, Bluetooth, may be provided in a receiver, which may for example be the inventive system for position determination, in order to improve the coverage of the navigation system and the accuracy of the position solution. Thus, optimized assistance of the user may be achieved.

According to a further aspect of the present invention, a combination with other localization methods, e.g. GPS, ultrasound, infrared, distance measurement methods, etc., may be provided to make the position determination more efficient, if possible.

According to a further aspect of the present invention, a control unit is used, which controls a position capture, position calculation or position communication in temporal or event-controlled manner. The control unit may for example be included by the inventive apparatus for determining the current position and for example trigger a determination of the current position due to a detected movement (event control).

According to a further aspect of the present invention, different sets of configuration parameters (profiles) may be used, which may also capture an adaptive adaptation.

Besides the advantages already described, the inventive positioning system may also be realized in purely passive fashion depending on the radio system used, which means that no subscription, logon or the like to the network is necessary. Thereby, existing systems, in particular, such as WLAN networks or DECT telephone facilities in office buildings, airports, etc., may be used without technical extension. Mobile systems with position determination may simply be introduced into the system and operated without administration of the network or the telephone facility. Furthermore, no disturbing influences on the functionality and availability of the radio system arise by the passive behavior.

Moreover, the inventive system is universally adaptable to new environments or dynamically reloadable on location by its parameterizability, in which the following parameters are used, for example: channel models, base station information, environment information.

According to a further embodiment of the present invention, a personal digital assistant (PDA) may be extended with a WLAN PCMCIA plug-in card. Thereby, unique MAC addresses of the base stations and the accompanying reception field strength can be determined.

A driver software contains all further above-described components and makes the position data available to a visualization surface upon request. The driver software uses information on the base stations, the environment and further configuration data as input parameters. With such systems, a guidance or information system may then be realized, for example.

According to a further aspect of the present invention, the inventive apparatus for determining the current position includes a screen formed to display the determined current position in the environment.

Depending on the circumstances, the inventive methods may be implemented in hardware or in software. The implementation may be effected on a digital storage medium, for example a floppy disk or CD with electronically readable control signals, which may cooperate with a programmable computer system, such that the corresponding method is executed. Thus, the invention generally also consists in a computer program product having a program code, stored on a machine-readable carrier, for performing the corresponding inventive method, when the computer program product is executed on a computer. In other words, the invention may thus also be realized as a computer program code for performing at least one method, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for determining the current position of a mobile device in an environment in which at least one transmitter is disposed, comprising:

a provider for providing a cartographic map of the environment, the cartographic map including field strength reference values at reference points;

a determinator for determining a field strength value;

an identifier for deriving reference points within reach that can be reached starting from a previous position of the mobile device by movement of the mobile device in the environment within a predetermined time interval, from the cartographic map of the environment; and a comparator for comparing the field strength value with the field strength reference values at the reference points within reach, wherein the reference point the field strength reference value of which most likely corresponds to the field strength value is established as current position.

2. The apparatus of claim 1, wherein the determinator is formed to measure the field strength value at the current position.

3. The apparatus of claim 1, wherein the determinator for determining a field strength value is formed to measure field strength values at regular measurement intervals.

4. The apparatus of claim 1, wherein the determinator for determining a field strength value is formed to determine the field strength reference values.

5. The apparatus of claim 4, wherein the determinator for determining a field strength value is formed to determine a field strength reference value by averaging among the currently measured field strength value and a mean value of measured field strength values determined at an earlier point in time.

6. The apparatus of claim 1, wherein the provider for providing the cartographic map is formed to enter a field strength value into the cartographic map of the environment at an accompanying reference point in order to update the cartographic map.

7. The apparatus of claim 1, wherein the identifier for deriving a reference point within reach is formed to establish a routing map, the routing map including possible connections between reference points that can be reached by movement of the mobile device.

8. The apparatus of claim 7, wherein the identifier for deriving the reference point within reach is formed to determine a shortest connection between a first reference point and a second reference point.

9. The apparatus of claim 7, wherein the identifier for deriving the reference point within reach is formed to determine the routing map using a routing algorithm.

10. The apparatus of claim 1, wherein the identifier for deriving the reference point within reach is formed to determine the reference point within reach using a routing algorithm.

11. The apparatus of claim 1, wherein the comparator is formed to determine the reference point within reach as the current position if the field strength reference value matches the field strength value at the current position within a predetermined value interval.

12. A method for determining a current position of a mobile device within an environment in which at least one transmitter is disposed, comprising:

providing a cartographic map of the environment, the cartographic map of the environment including field strength reference values at reference points;

determining a field strength value at the current position;

deriving reference points within reach that can be reached starting from a previous position of the mobile terminal by movement of the mobile terminal in the environment within a predetermined time interval, from the cartographic map of the environment; and comparing the field strength value to the field strength reference values at the reference points within reach, characterized by the step of establishing the reference point the field strength reference value of which most likely corresponds to the field strength value as current position, wherein the method is performed in a hardware apparatus.

13. A computer readable medium with a program code for performing, when the program is executed on a computer, a method for determining a current position of a mobile device within an environment in which at least one transmitter is disposed, comprising:

providing a cartographic map of the environment, the cartographic map of the environment including field strength reference values at reference points;

determining a field strength value at the current position;

deriving reference points within reach that can be reached starting from a previous position of the mobile terminal by movement of the mobile terminal in the environment within a predetermined time interval, from the cartographic map of the environment; and comparing the field strength value to the field strength reference values at the reference points within reach, characterized by the step of establishing the reference point the field strength reference value of which most likely corresponds to the field strength value as current position.

* * * * *